US009286477B2

(12) United States Patent
Sobel et al.

(10) Patent No.: US 9,286,477 B2
(45) Date of Patent: Mar. 15, 2016

(54) SECURE APP ECOSYSTEM WITH KEY AND DATA EXCHANGE ACCORDING TO ENTERPRISE INFORMATION CONTROL POLICY

(75) Inventors: William E. Sobel, Jamul, CA (US); Thomas Jeffrey Enderwick, La Jolla, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 141 days.

(21) Appl. No.: 13/598,248

(22) Filed: Aug. 29, 2012

(65) Prior Publication Data

US 2014/0068273 A1   Mar. 6, 2014

(51) Int. Cl.
| | |
|---|---|
| G06F 11/30 | (2006.01) |
| G06F 21/60 | (2013.01) |
| H04L 29/06 | (2006.01) |
| G06F 17/30 | (2006.01) |

(52) U.S. Cl.
CPC ........ *G06F 21/606* (2013.01); *G06F 17/30238* (2013.01); *G06F 21/604* (2013.01); *H04L 63/0428* (2013.01); *H04L 63/20* (2013.01)

(58) Field of Classification Search
CPC ...... G06F 21/62; G06F 21/604; G06F 21/606
USPC ................................................. 713/189–193
See application file for complete search history.

(56) References Cited

U.S. PATENT DOCUMENTS

| | | | |
|---|---|---|---|
| 2007/0056042 A1 | 3/2007 | Qawami et al. | |
| 2007/0162541 A1* | 7/2007 | Dhawan | ........... H04L 41/0806 709/203 |
| 2007/0271459 A1* | 11/2007 | Gomez | ............... H04L 63/0442 713/171 |
| 2010/0292556 A1* | 11/2010 | Golden | ............... A61B 5/7465 600/364 |
| 2012/0079609 A1 | 3/2012 | Bender et al. | |
| 2012/0102073 A1* | 4/2012 | Patel | ................... H04L 12/5815 707/803 |
| 2012/0129503 A1 | 5/2012 | Lindeman et al. | |
| 2012/0159163 A1* | 6/2012 | von Behren | ........ G06Q 20/3552 713/168 |
| 2012/0210443 A1* | 8/2012 | Blaisdell | ................. G06F 21/12 726/27 |
| 2012/0214444 A1 | 8/2012 | McBride et al. | |

(Continued)

OTHER PUBLICATIONS

Pranata et al., "A distributed community approach for protecting resources in Digital Ecosystem," Advanced Computer Science and Information System (ICACSIS), 2011 International Conference on Year: 2011 pp. 95-100.*

(Continued)

*Primary Examiner* — Christopher Brown
*Assistant Examiner* — Roderick Tolentino
(74) *Attorney, Agent, or Firm* — Patent Law Works LLP

(57) ABSTRACT

Multiple apps of an ecosystem on a computer securely exchange encrypted data according to an information control policy of an enterprise, without allowing unauthorized access from outside of the ecosystem. An ecosystem agent creates an ecosystem directory, which contains policy information and identification information concerning each specific app in the ecosystem, including the ecosystem agent. Each ecosystem app generates an asymmetric key pair, the public key of which it shares only with apps in the ecosystem through the directory. The ecosystem agent's private key is used to encrypt the directory. Data is securely communicated between apps in the ecosystem, by encrypting and decrypting messages and data objects with the appropriate ecosystem app keys. Each specific app in the ecosystem complies with enterprise information control policy. Ecosystem apps can read a policy from the directory, and receive policy updates from the enterprise.

19 Claims, 8 Drawing Sheets

(56) References Cited

U.S. PATENT DOCUMENTS

| | | | |
|---|---|---|---|
| 2013/0019323 A1* | 1/2013 | Arvidsson | H04W 12/06 726/30 |
| 2013/0152208 A1* | 6/2013 | King | H04L 67/00 726/26 |
| 2014/0013406 A1* | 1/2014 | Tremlet | G06F 21/32 726/5 |

OTHER PUBLICATIONS

Wang et al., "Implementing and Optimizing an Encryption Filesystem on Android," Mobile Data Management (MDM), 2012 IEEE 13th International Conference on Year: 2012 pp. 52-62.*

PCT International Search Report and Written Opinion for Counterpart Application PCT/US13/56967 dated Jan. 7, 2014, 8 pages.

"Good Technology aims to secure BYOD policies," Alastair Stevenson, <URL: http://www.v3.co.uk/v3-uk/news/2192235/good-technology-aims-to-secure-byod-policies>, Jul. 17, 2012, pp. 1 and 2.

"Box Launches Its Own Enterprise Cloud Operating Ecosystem," Scott M. Fulton, <URL: http://readwrite.com/2012/03/28/box-launches-its-own-enterprise>, Mar. 28, 2012, 5 pages.

* cited by examiner

SECURE APP ECOSYSTEM WITH KEY AND DATA EXCHANGE ACCORDING TO ENTERPRISE INFORMATION CONTROL POLICY

TECHNICAL FIELD

This disclosure pertains generally to computer security, and more specifically to providing a secure ecosystem of apps that securely exchange encrypted data according to an information control policy of an enterprise, without allowing unauthorized access from outside of the ecosystem.

BACKGROUND

As it becomes ever more common for individuals to own and carry mobile computing devices such as smartphones and tablet computers, people want the freedom to use their own devices for both work and personal use (this approach is sometimes called the bring-your-own-device model). Users are familiar and comfortable with their own devices, and do not want to learn how to operate and carry a second device for work. At the same time, enterprises have a legitimate need to control the handling of their confidential information when it is accessed and processed on non-enterprise devices.

Productive work on any computing platform relies on the ability for the same data to be securely accessed by and interchanged between multiple apps, each of which is suitable for a different aspect of that interaction. However, employers want to limit the access and use of confidential corporate data according to enterprise information control policy. Furthermore, some users (e.g., consultants or those with multiple employers) would like to use their personal computing devices for their professional relationships with multiple organizations, each of which has separate information control needs.

It would be desirable to address these issues.

SUMMARY

A secure ecosystem is provided on a computer, such as a mobile computing device. Multiple apps that are members of the ecosystem securely exchange encrypted data according to an information control policy of an enterprise, without allowing unauthorized access from outside of the ecosystem. A specific ecosystem app referred to herein as an ecosystem agent creates an ecosystem directory on the computing device. In one embodiment, the ecosystem directory is created at a location on the computing device which is based on the name of the ecosystem. The ecosystem directory contains an entry for each specific app in the ecosystem, including the ecosystem agent. Each directory entry comprises policy information and identification information concerning the specific app. For example, such an entry can contain: 1) a policy for the specific app, 2) information enabling the specific app to obtain policy updates, and 3) information concerning the specific app enabling other apps in the ecosystem to securely communicate encrypted data to the specific app. In one embodiment, the information that enables other apps to securely communicate to the specific app is in the form of a bundle identifier or package name of the specific app, an address of the specific app, a public key of the specific app (and in some embodiments an ecosystem-wide symmetric encryption key which is used to encrypt the public keys of specific apps), media types supported by the specific app, and a localized title of the specific app.

In one embodiment, each specific app on the computing device that is configured for ecosystem membership generates an asymmetric key pair, the public key of which the specific app shares only with apps in the ecosystem, and the private key of which the specific app does not share at all. The ecosystem agent can use its private key to encrypt the ecosystem directory, such that the ecosystem agent's public key is needed to decrypt the ecosystem directory. In one embodiment, the ecosystem agent also generates an ecosystem-wide symmetric encryption key, which is used to encrypt and decrypt public keys of the ecosystem apps, thereby further preventing access of the ecosystem app's public keys from outside of the ecosystem.

Data is securely communicated between apps in the ecosystem, such that the communicated data cannot be accessed from outside of the ecosystem without authorization from within the ecosystem. This secure communication between ecosystem apps can comprise encrypting data with a first key by a providing app in the ecosystem, such that any receiving apps in the ecosystem can decrypt the data with a second key. More specifically, in order to securely communicate data to a single ecosystem app, this can take the form of a first ecosystem app reading the public key of a second ecosystem app from the ecosystem directory. The first ecosystem app uses the second ecosystem app's public key to encrypt a message or data object to securely communicate to the second ecosystem app. The first ecosystem app communicates or shares the encrypted message or data object with the second ecosystem app, and the second ecosystem app decrypts it using its own private key. In order to securely communicate data to multiple ecosystem apps, a first ecosystem app can encrypt a message or data object using its own private key. The first ecosystem app can then communicate or share the encrypted message or data object with the target plurality of other ecosystem apps. The receiving ecosystem apps can read the public key of the first ecosystem app from the directory, and decrypt the message or data object with the first app's public key. Each specific app in the ecosystem complies with enterprise information control policy. This can take the form of each specific app in the ecosystem reading its policy from the ecosystem directory, and then complying with its policy. In some embodiments, ecosystem apps can also receive policy updates from the enterprise, and comply with the received policy updates.

An app on the computing device that is configured for ecosystem membership but is not a member of the ecosystem can invoke the ecosystem agent with a request to join the ecosystem. The ecosystem agent validates the trust status of the app seeking to join, and if successful adds the new app to the ecosystem. This can take the form of writing an entry to the ecosystem directory for the new app, the written entry comprising at least information concerning the new app enabling other apps in the ecosystem to securely communicate encrypted data to the new app. The ecosystem agent can provide its own public key to the new app, thereby enabling the new app to decrypt the directory with the ecosystem agent's public key. In embodiments in which the ecosystem agent's public key is itself encrypted with the ecosystem-wide symmetric encryption key, the ecosystem agent also provides the ecosystem-wide symmetric encryption key to the new app, so that the new app can decrypt the ecosystem agent's public key. The newly joined app reads its directory entry, obtains its policy from the directory, and complies with its obtained policy. In some embodiments, the newly joined app also validates the trust status of the ecosystem agent, and proceeds to join the ecosystem only if the ecosystem agent is validated as trustworthy.

A listing can be maintained of mappings between underlying media types and functionality for processing content in ecosystem specific encrypted formats based on the underlying media types. This listing can be used to properly process the ecosystem specific encrypted messages and objects in the ecosystem specific encrypted formats based on the underlying media types. Components external to the computing device can also be members of the ecosystem, wherein the external components provide services to ecosystem apps. Such external components can receive keys and policies directly from the enterprise, and comply with the received policies.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
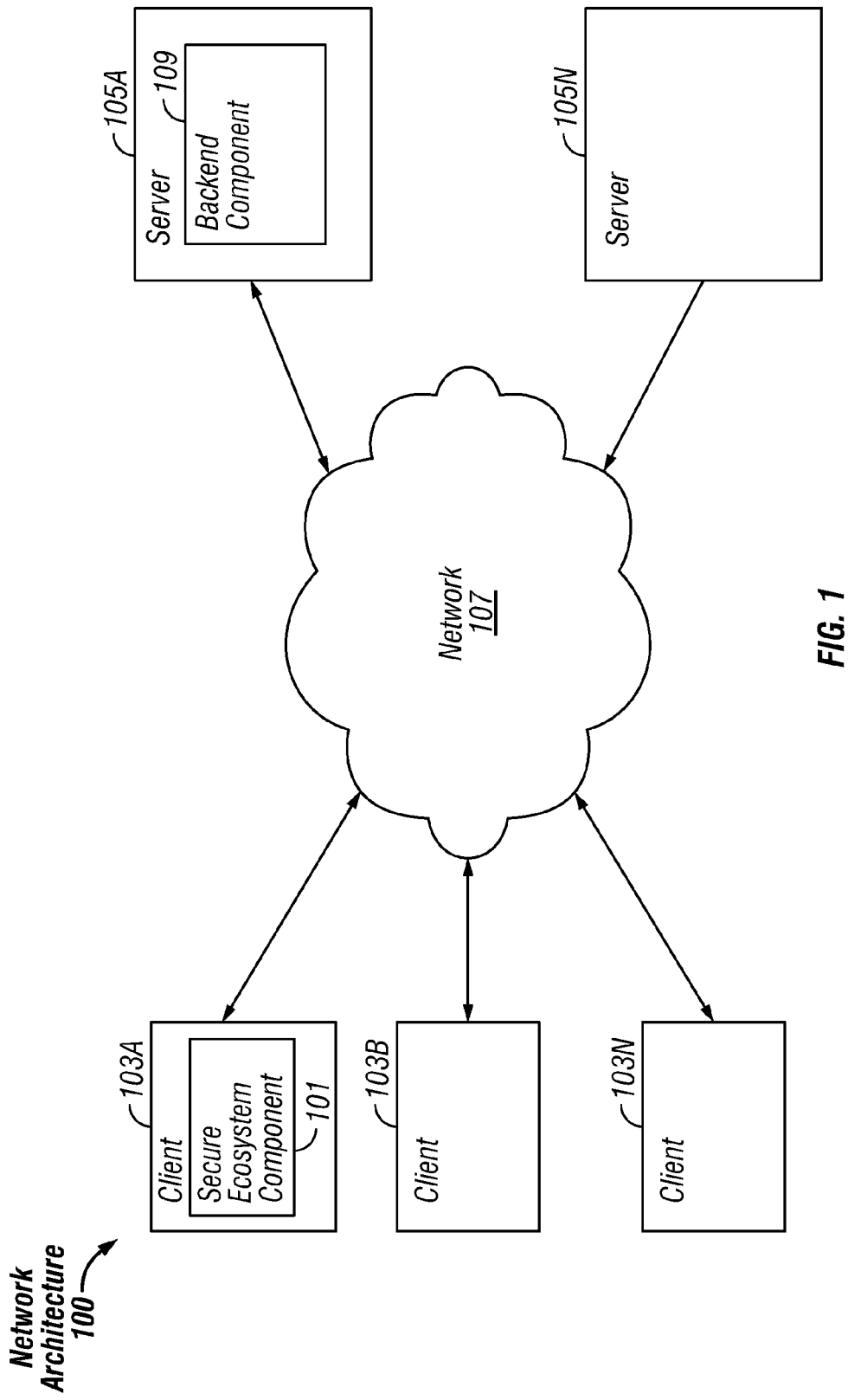
FIG. 1 is a block diagram of an exemplary network architecture in which a secure ecosystem component can be implemented, according to some embodiments.

FIG. 1 is a block diagram illustrating an exemplary network architecture 100 in which a secure ecosystem component 101 can be implemented. The illustrated network architecture 100 comprises multiple clients 103A, 103B and 103N, as well as multiple servers 105A and 105N. In FIG. 1, the secure ecosystem component 101 is illustrated as residing on client 103A, with a backend component 109 residing on server 105A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet and laptop computers are other examples of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
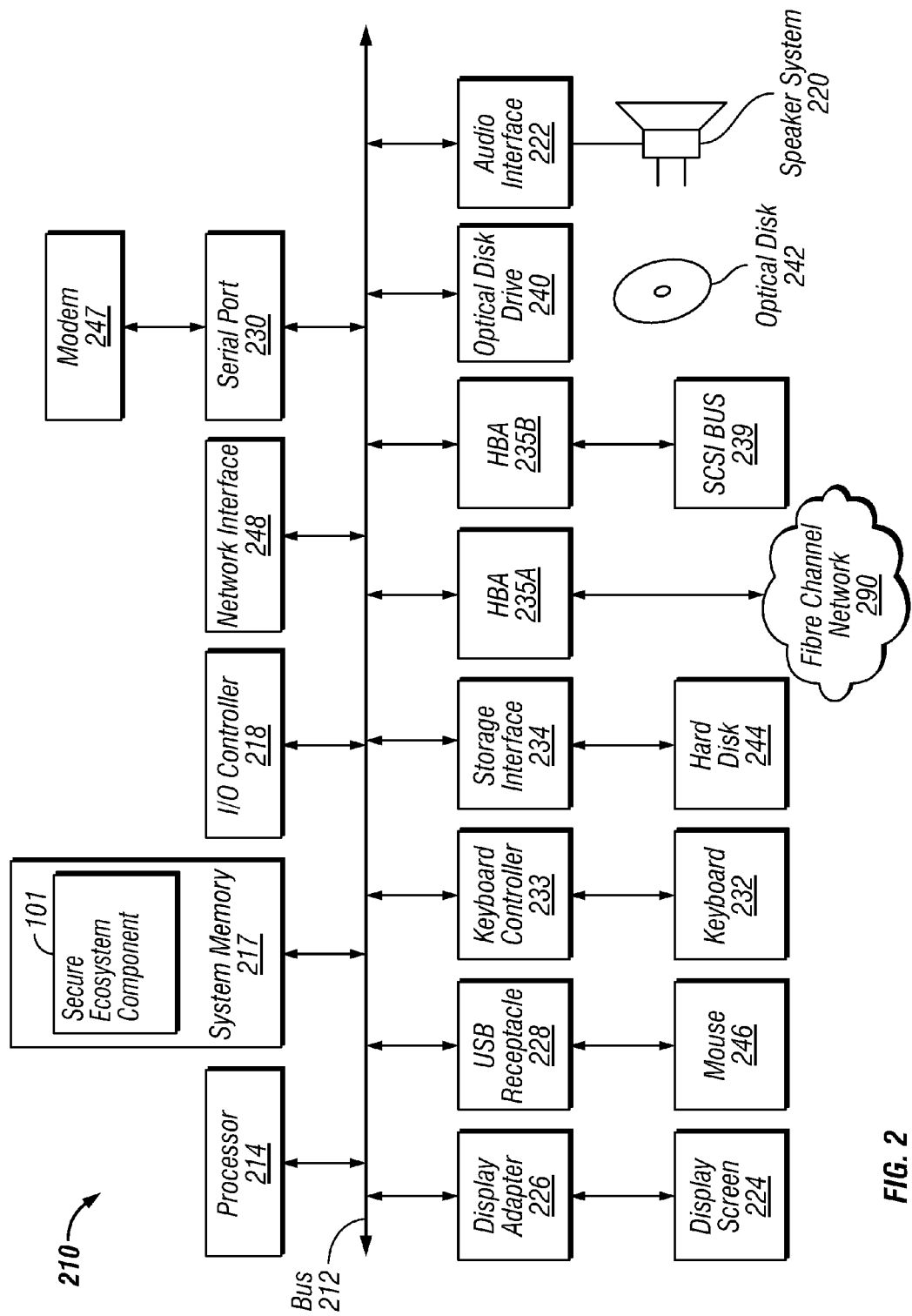
FIG. 2 is a block diagram of a computer system suitable for implementing a secure ecosystem component, according to some embodiments.

FIG. 2 is a block diagram of a computer system 210 suitable for implementing a secure ecosystem component 101. Both clients 103 and servers 105 can be implemented in the form of such computer systems 210. A computer system 210 of the type illustrated in FIG. 2 can but need not be in the form of a mobile computing device. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the secure ecosystem component 101 is illustrated as residing in system memory 217. The workings of the secure ecosystem component 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
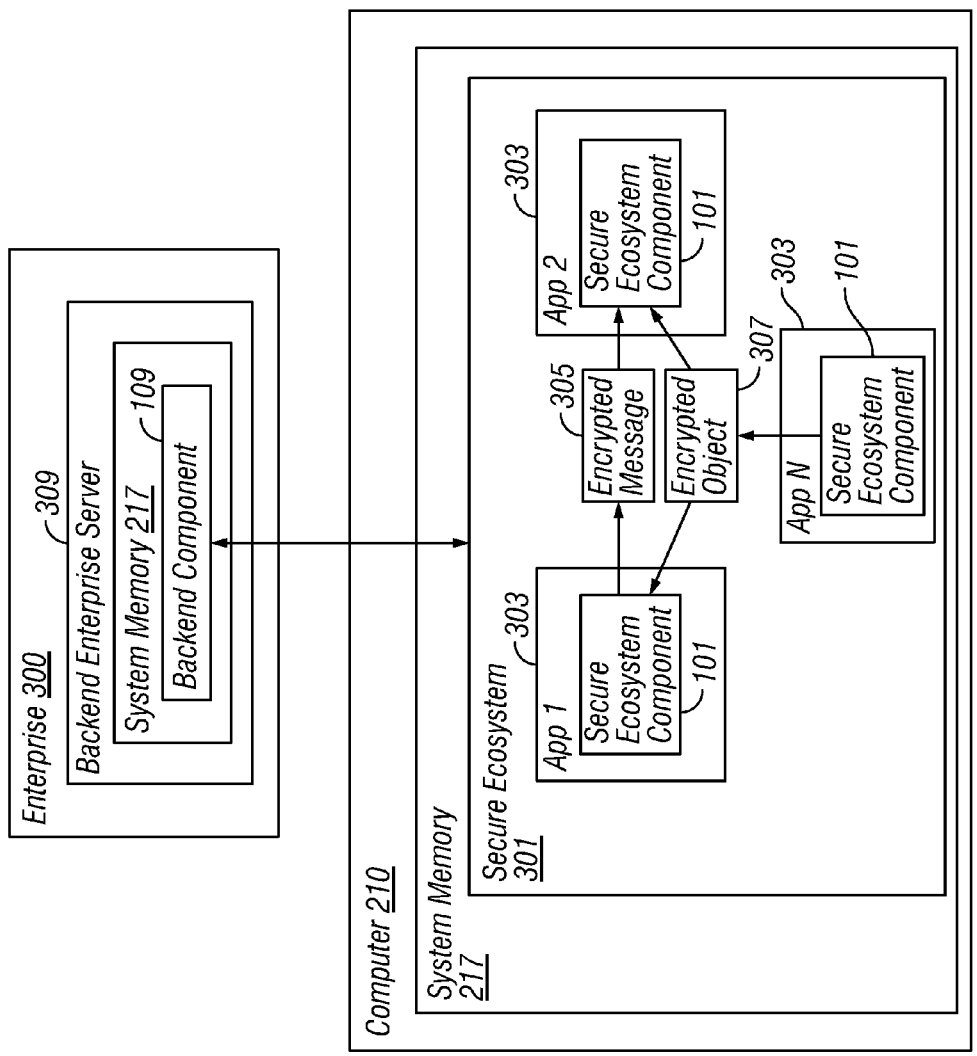
FIG. 3 is a block diagram providing a high level overview of secure ecosystem component functionality in the context of a secure ecosystem on a computing device, according to some embodiments.

FIG. 3 illustrates a high level overview of secure ecosystem component 101 functionality running in the context of a secure ecosystem 301 on a computer 210, according to some embodiments. As described above, the functionalities of the secure ecosystem component 101 can reside on a client 103 (including but not limited to a client 103 in the form of a mobile computing device), a server 105, or be distributed between multiple computer systems 210, including within a cloud-based computing environment in which the functionality of the secure ecosystem component 101 is provided as a service over a network 107. It is to be understood that although the secure ecosystem component 101 is illustrated in FIG. 3 as a single entity, the illustrated secure ecosystem component 101 represents a collection of functionalities, which can be instantiated as a single or multiple modules as desired (an instantiation of specific, multiple modules of the secure ecosystem component 101 is illustrated in FIG. 3). It is to be understood that the modules of the secure ecosystem component 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the secure ecosystem component 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, multiple apps 303 configured for use within an ecosystem 301 run in a secure ecosystem 301 in the system memory 217 of a computer 210, such as a mobile computing device. As an example for purposes of illustration, FIG. 3 depicts three apps 303 running in the ecosystem 301, but in practice an ecosystem can include other numbers of apps 303, including much larger numbers. Each app 303 configured for ecosystem 301 membership contains a secure ecosystem component 101, which provides ecosystem specific functionality discussed in detail below. The secure ecosystem component 101 functionality enables multiple apps 303 (for example, mobile apps 303) to work as a secure, interconnected ecosystem 301 on the computer 210, in accordance with an information control policy provided by an enterprise 300. An "ecosystem" 301 as the term is used herein means a group of apps 303 on a computing device 210 configured such that the apps 303 can securely exchange encrypted messages 305 and encrypted data objects 307 with each other, according to an enterprise information control policy, wherein apps 303 and other components outside of the ecosystem 301 do not have unauthorized access to the ecosystem 301 or its contents. As "enterprise" 300 is used herein, the term means any organization that makes its electronic data available to individuals under its management according to an information control policy. Corporations, governments and universities are examples of enterprises 300.

As explained in detail below, apps 303 within the ecosystem 301 can securely send encrypted messages 305 and share data encrypted objects 307 (e.g., files), without allowing unauthorized access from apps 303 outside of the ecosystem 301, including those running on the same computing device 210. The ecosystem 301 can comprise both enterprise specific apps 303 which can be downloaded from a backend component 109 running in the system memory 217 of a backend enterprise server 309, and third-party apps 303 originating from outside of the enterprise (e.g., commercial apps 303 distributed on Google Play or Apple's App Store). Procedures for distributing enterprise ready apps 303 containing secure ecosystem component 101 functionality is discussed in detail below.

More than one ecosystem 301 may be co-resident on a single computing device 210, and configured such that the co-resident ecosystems 301 are not allowed to access each other's data, or otherwise participate in the protected ecosystem-level data sharing described herein. As described in detail below, the secure ecosystem component 101 uses efficient protocols for secure enrollment of authorized apps 303 into the ecosystem 301, for the encryption of ecosystem data, and for the secure sharing of this data between apps 303 in the same ecosystem 301, according to enterprise policy.

Figure 4A:
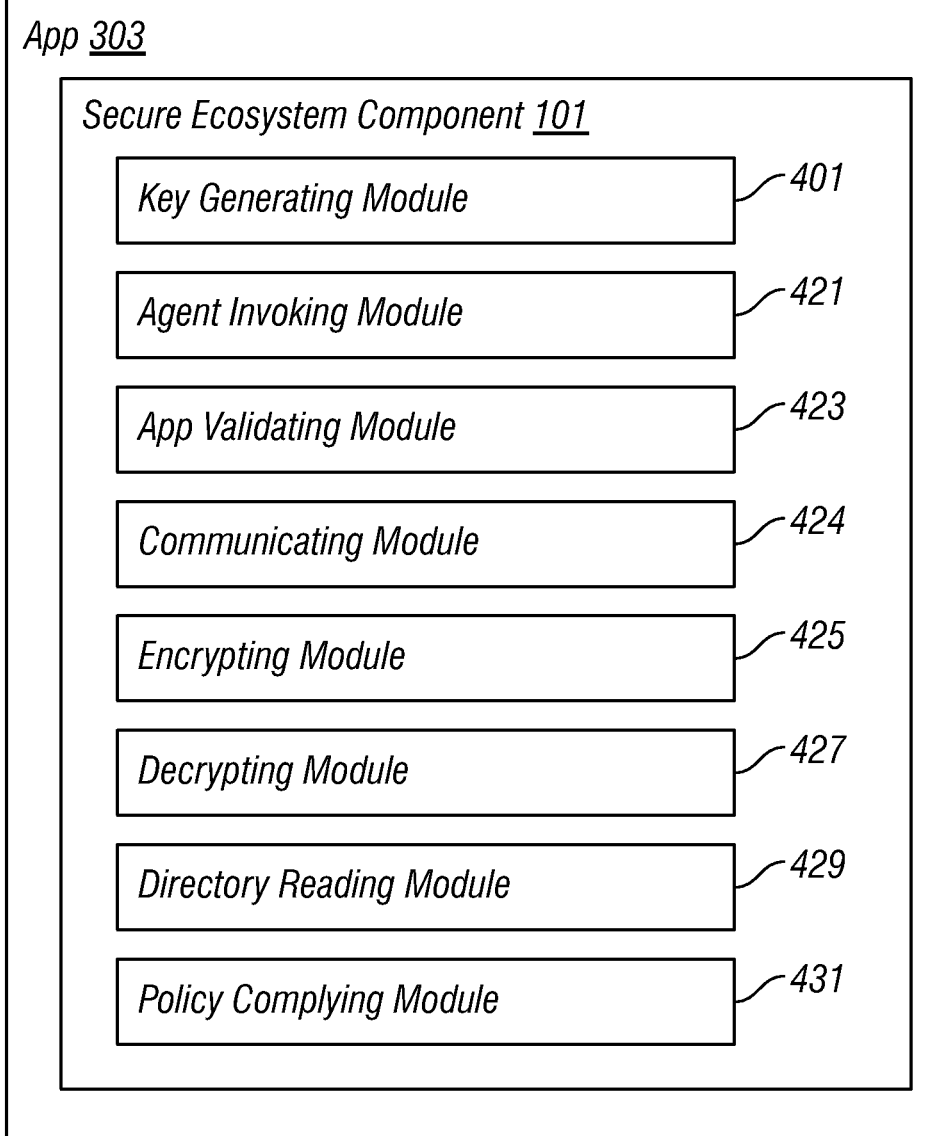
FIG. 4A is a block diagram illustrating the modules of a secure ecosystem component of an ecosystem app, according to some embodiments.

FIG. 4A illustrates the modules of a secure ecosystem component 101 of an app 303 configured to participate in an ecosystem 301, according to some embodiments. The operations of these modules are discussed in detail in conjunction with FIG. 5. A key generating module 401 of the secure ecosystem component 101 is used to generate keys 409 used to encrypt content for secure communication within the ecosystem 301. An agent invoking module 421 of the secure ecosystem component 101 is used to invoke the ecosystem agent 411, which is a particular ecosystem app 303 discussed in detail below. An app validating module 423 of the secure ecosystem component 101 is used to validate other apps as being trusted to participate in the ecosystem 301. A communicating module 424 of the secure ecosystem component 101 is used for communication between ecosystem apps 303, and between an ecosystem app 303 and the backend enterprise server 309. An encrypting module 425 encrypts content for secure communication, and a decrypting module 427 decrypts encrypted content. A directory reading module 429 reads content from an ecosystem directory, which is described in detail below. Finally, a policy complying module 431 is used to ensure compliance with an enterprise information control policy. In other embodiments, the secure ecosystem component 101 of an app 303 configured to participate in an ecosystem 301 can comprise more, fewer or different modules as desired.

Figure 4B:
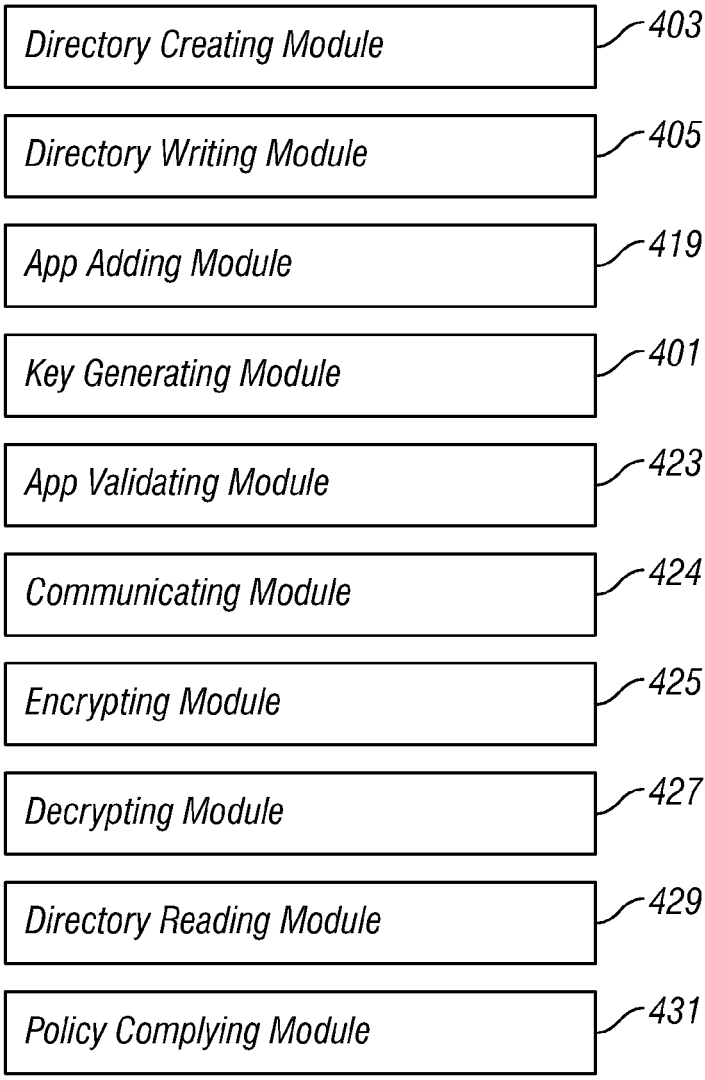
FIG. 4B is a block diagram illustrating the modules of a secure ecosystem component an ecosystem agent, according to some embodiments.

FIG. 4B illustrates the modules of a secure ecosystem component 101 of an ecosystem agent 411, according to some embodiments. As noted above, an ecosystem agent 411 is a specific ecosystem app 303. As with FIG. 4A, the operations of the modules illustrated in FIG. 4B are discussed in detail in conjunction with FIG. 5. A directory creating module 403 of the secure ecosystem component 101 creates an ecosystem directory 413. A directory writing module 405 of the secure ecosystem component 101 writes content to the ecosystem directory 413. An app adding module 419 of the secure ecosystem component 101 adds new apps 303 to the ecosystem 301. The secure ecosystem component 101 of an ecosystem agent 411 also contains a key generating module 401, an app validating module 423, a communicating module 424, an encrypting module 425, a decrypting module 427, a directory reading module 429 and a policy complying module 431, which perform the same functions as described above in conjunction with FIG. 4A. In other embodiments, the secure ecosystem component 101 of an ecosystem agent 411 can comprise more, fewer or different modules as desired.

Figure 5:
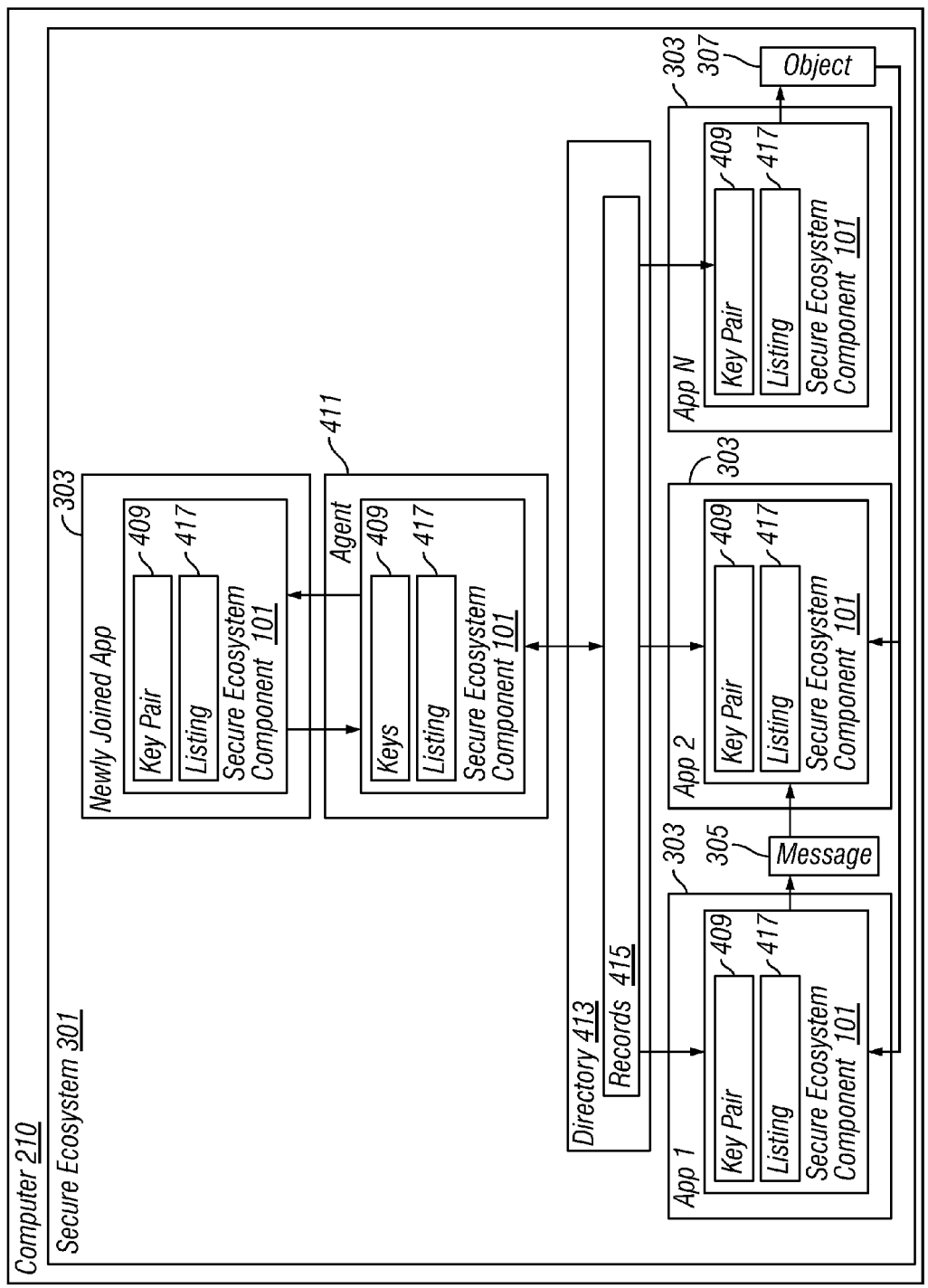
FIG. 5 is a block diagram of the operation of a secure ecosystem, according to some embodiments.

Turning now to FIG. 5, the operation of a secure ecosystem 301 is described, according to some embodiments. As explained in greater detail below, the various apps 303 of the ecosystem 301 use a set of keys 409 to encrypt and decrypt data so as to allow authorized access by certain ones or all of the ecosystem apps 303, while preventing access from outside of the ecosystem 301. In one embodiment, a key generating module 401 of the secure ecosystem component 101 of each app 303 in the ecosystem 301 generates an asymmetric key pair, the public key 409$_{public}$ of which the app 303 shares only with other members of ecosystem 301 (as described below) and the private key 409$_{private}$ of which only the app 303 knows. It is to be understood that as the term is used herein in the context of an ecosystem 301, a public key 409$_{public}$ is not public to the whole world or public to all components on the computing device 210, but instead is only public within the ecosystem 301. In one embodiment, in addition to the ecosystem app 301 key pairs 409, there is a single ecosystem-wide symmetric encryption key 409$_{ecosystem}$ not associated with any specific ecosystem app 303, but instead with the ecosystem 301 as a whole. In some embodiments, the ecosystem-wide symmetric encryption key 409$_{ecosystem}$ is itself encrypted with a key encryption key (KEK) 409$_{key}$. The ecosystem-wide symmetric encryption key 409$_{ecosystem}$ and/or the KEK 409$_{key}$ can be generated by the key generating module 401 of the secure ecosystem component 101 of an app 303 referred to herein as the ecosystem agent 411, which is discussed below. In different embodiments, the specific keys 409 that are used in the context of an ecosystem 301 vary. The uses of the various keys 409 are described in more detail below.

A given ecosystem 301 is initially established on a computing device 210 by the ecosystem agent 411, which as noted above as a particular ecosystem app 303. More specifically, an ecosystem agent 411 is a type of ecosystem app 303 that performs the specific functionality described herein. Although the agent 411 is described and illustrated herein as a single entity, in some embodiments the functionality of the agent 411 can be distributed between multiple apps 303. The agent 411 is typically obtained from the enterprise 300. An example of how the agent 411 can be obtained from an enterprise 300 is by downloading it from a backend enterprise server 309. As explained in more detail below, the agent 411 is trusted to establish the ecosystem 301, for example because the agent 411 is distributed provisioned with an assertion signed by a trusted source stipulating that this particular app 303 is indeed the agent 411.

When the agent 411 is installed, a directory creating module 403 of its secure ecosystem component 101 creates an encrypted ecosystem directory 413, which the agent 411 subsequently manages. In one embodiment, the location of the directory 413 is computed based on the name of the ecosystem 301, so that an app 303 that knows the name of the ecosystem 301 can locate (but not, without the appropriate key(s) 409, read) the directory 413. Using the ecosystem name, the location of the directory 413 can be computed using, for example, a hashing algorithm (e.g., double hashing) to manage conflicts. In other embodiments, the location of the directory 413 is safeguarded against access from outside of the ecosystem 301 in other ways. For example, in one embodiment the agent 411 passes the location of the directory 413 to a new app 303 as part of the protocol for joining the ecosystem 301. The location of the directory 413 is platform-specific. For example, under iOS the directory 413 can be stored as a pasteboard object. In some embodiments, the ecosystem agent 411 maintains the directory 413, and no other app 303 can write to or otherwise modify the directory 413, although other ecosystem apps 303 can typically read the directory 413 provided that they have the appropriate key(s) 409 to decrypt it. The directory 413 can be encrypted and signed using the private key 409$_{private}$ of the ecosystem agent 411. On platforms under which the directory 413 cannot be protected against deletion or modification by other apps 303, the agent 411 can periodically check the integrity of the directory 413 and perform repairs as needed. If an app 303 finds the directory 413 to be missing or corrupt, the detecting app 303 can send a corresponding indication of the damage to the agent 411.

The directory contains a record 415 (entry) for each active ecosystem app 303, including the ecosystem agent 411. The record 415 for an app 303 includes a policy block and an information block. The policy block includes an enterprise 300 supplied default (initial) policy for the app 303, as well as the address (e.g., URL) for a backend enterprise server 309 from which the app 301 can obtain periodic policy updates. The usage of app-level enterprise policies is discussed in greater detail below. The information block for a specific ecosystem app 303 includes information to be used by other apps 303 in the ecosystem to engage in secure communications with the specific app 303, such as, for example, the bundle-id or packageName of the app 303, the address of the app 303, the public key 409$_{public}$ of the app 301, the media types supported by the app 303, and the localized title of the app 303. The format of the address of the app 303 varies between platforms. For example, under iOS custom URL schemes are used as app addresses, whereas under Android an Intent is used where the Universal Resource Identifier ("URI") begins with the app's packageName. The expression of supported media types is also platform-specific. For example, under iOS media types are expressed as MIME types, Universal Type Identifiers ("UTIs") and corresponding file extensions, whereas under Android media types are expressed as MIME types and corresponding file extensions. The localized title of the app 303 can be used for user confirmation during the join protocol, and/or for a user-facing menu.

As discussed in greater detail below, ecosystem apps 303 use the information in the policy block of their own directory record 415 to learn and thus comply with their enterprise policy. Additionally, ecosystem apps 303 use the information blocks of the directory records 415 of the other apps 303 in the ecosystem 301 to learn of the other ecosystem apps 303, and to obtain the appropriate keys 409 and identification information to share encrypted objects 307 and send encrypted messages 305 to particular ecosystem apps 303 (or to all of them).

When the agent 411 is installed and creates the directory 413, a directory writing module 405 of the secure ecosystem component 101 of the agent 411 writes a directory record 415 concerning the agent 411 to the directory 413 (recall that the agent 411 is itself an ecosystem app 303). An app adding module 419 of secure ecosystem component 101 of the agent 411 then manages requests by other apps 303 to join the ecosystem 301 on the computing device 210. In order to understand the process of apps 303 requesting to join the ecosystem 301, it will be helpful to first discuss the distribution of apps 303 for mobile computing devices 210, as well as other types of computers 210. A large community of developers write applications ("apps") for a variety of popular mobile operating systems. For example, Apple's iOS (formerly known as iPhone OS) is a mobile operating system that runs on Apple mobile devices such as the iPhone, the iPod Touch and the iPad. Many apps 303 for iOS are available for download from Apple's App Store. Android is an open-source, Linux based operating system for mobile devices. Many Android apps 303 are available either for purchase or for free through Google Play (formerly known as Android Market). Android apps 303 can also be downloaded from other online stores and additional third-party sites. Another example is Windows Phone, which is a mobile operating system developed by Microsoft, which runs on smartphones from vendors such as Nokia, Acer and Fujitsu. Users can download apps 303 for Windows Phone from the Windows Phone Marketplace, which is run by Microsoft. iOS, Android and Windows Phone are just examples of currently popular mobile operating systems, but others exist as well. Additionally, although much of this disclosure describes embodiments in which ecosystems 301 are implemented on mobile computing devices 210, in other embodiments ecosystems 301 are implemented on other types of computers 210 such as desktops and workstations. In any case, apps 303 can be downloaded from a variety of sources to a computer 210. Apps 303 that are to participate in an ecosystem 301 can be downloaded from the enterprise 300 (e.g., from the backend enterprise server 309), or from a third-party site such as Apple's App Store or Google Play.

Apps 303 that are provided by the enterprise 300 are signed by the enterprise 300 prior to distribution. Where apps 303 are provided by the enterprise 300, any secure ecosystem component 101 specific functionality can be instantiated in the app 303 by the enterprise 300, or implemented in code provided by the publisher of the secure ecosystem component 101, and added to the app 303 through the use of app-wrapping. App-wrapping involves adding code to an existing app 303. This necessitates that the app 303 that contains the added code be re-signed prior to distribution. This works for enterprise 300 provided apps 303, because the enterprise 300 can supply the certificate for signing its apps 303. An app that is developed outside of the enterprise 300 and distributed by a third-party is signed by its developer (a vendor of third party apps 303) before distribution. Thus, where non-enterprise apps 303 are configured to join ecosystems 301 before being distributed by third-parties, the secure ecosystem component 101 specific functionality is added to the apps 303 in code provided by the publisher of the secure ecosystem component 101, and added to the app 303 through the use of a Software Development Kit ("SDK") or library that can be included in the build process. The developer can then re-sign the modified app 303 before distribution. To gain access to such code, third-party app vendors establish a relationship with the publisher of the secure ecosystem component 101 under which the publisher supplies the SDK. In different embodiments, the publisher restricts access to specific vendors according to various desired criteria, and/or reviews third-party apps 303 configured for ecosystem 301 use before allowing their distribution.

It is to be understood whether the secure ecosystem component 101 functionality is added to an app through app-wrapping or an SDK, the added code changes default behaviors of the app 303 to instantiate the secure ecosystem component 101 functionality described herein. This can be implemented by intercepting system calls that perform default functionality to be modified (e.g., calls to access the file system), and replacing or wrapping them with calls that execute the secure ecosystem component 101 specific functionality. For example, attempts to write (and read) data to disk are intercepted to automatically provide the encryption (and decryption) described herein, whereas inter-process communications are intercepted to ensure that copy/paste (and other inter-process communications) of protected content comply with policy as described herein (i.e., by being accessible only to ecosystem members, through proper encryption, restrictive namespaces, MIME-type shifting, etc.). The specific system calls intercepted can vary between embodiments. The implementation mechanics of system call interception varies between mobile operating systems. For example, under iOS the interceptions occur at runtime. Under Android, the code is disassembled, modified, added to, and re-assembled.

In one embodiment, all apps 303 that are to participate in an ecosystem 303 are provisioned with a signed assertion of their authenticity prior to distribution. For apps 303 being downloaded from the backend enterprise server 309, the assertion can be signed by the enterprise 300. For apps 303 being distributed through third-party sites, the assertion can be signed by a trusted party, such as the publisher of the secure ecosystem component 101, a trusted third-party authenticator of electronic identities, the enterprise 300, etc. An assertion can contain an identifier of the specific app 303 (e.g., the bundle-id for an iOS app 303, the packageName for an Android app 303), the address of the app 303 and the localized title of the app 303. In different embodiments, an assertion can contain more, less or different information concerning the app 303, with the basic idea being that the trusted signature verifies that the app 303 is trusted to join the ecosystem 301, and the information concerning the app 303 identifies the app 303 with enough particularity to confirm that the specific app 303 on the computing device 210 is the one that the assertion verifies. For example, in the specific context of the join protocol (discussed below), where the mobile operating system provides a reliable identification of the app 303 that is presenting the assertion, the app 303 receiving the assertion can validate the assertion, coupled with the received message, in the context of receiving the message on the device 210.

Returning to the discussion of an app 303 requesting to join the ecosystem 301, the key generating module 401 of the secure ecosystem component 101 of an app 303 seeking to join the ecosystem 301 generates an asymmetric key pair, comprising a public key $409_{public}$ which the app 303 shares only with members of ecosystem 301 and a private key $409_{private}$ which the app 303 does not share at all. In other embodiments, the specific format or structure of the keys 409 used by ecosystem apps 303 varies. An agent invoking module 421 of the secure ecosystem component 101 of the app 303 invokes the agent 311 with a request to join the ecosystem 301, which in some embodiments includes the app's public key $409_{public}$ so that the agent 411 can encrypt return communication to the app 303. The agent 411 is addressable based on the name of the ecosystem 301, so that an app 303 that knows the name of the ecosystem 301 can invoke the agent 411 to make a request to join the ecosystem 301. In the case of an enterprise app 303, the ecosystem name can be provisioned in the app bundle prior to distribution, such that the app 303 knows the ecosystem name. In the case of a third-party app 303 that is configured so as to be capable of joining an ecosystem 301, the app 303 can prompt the user to enter the ecosystem name. The user can provide the name by manually entering it, by scanning a QR code or other image that encodes the name, as a function of the user's email address, etc. In one embodiment, the ecosystem 301 can be auto-discovered, using operating system specific methods to find the available agent 411 or directory 413 resident on the device 210. In another embodiment the installed app 303 can receive the ecosystem name from the enterprise 300, for example by communicating with the backend server 309. The reason that a third-party app 303 is not provisioned with the ecosystem name prior to distribution is that even though the app 303 is configured to be able to join an ecosystem 301 generally, it is not known in advance where the app 303 will be installed on what the name of the ecosystem(s) 301 or its various install target(s) will be.

The app 303 uses the ecosystem name to make the request to the agent 411 to join the ecosystem 301. The method of invoking the agent 411 is platform-specific. For example, in iOS the agent 411 is addressable via a custom URL scheme based on the ecosystem name. More specifically, under current versions of iOS, the UIApplication:openURL: method is used, wherein the URL is composed using the agent's custom URL scheme, and the base64-encoded request is passed as a query-string argument. It is to be understood that this is an implementation specific example of making a join request according to one embodiment using iOS.

The app 303 seeking to join the ecosystem 301 establishes its status as trusted to the agent 411. In one embodiment, this takes the form of the app 303 providing its signed assertion to the agent 411 as part of the join request. An app validating module 423 of the secure ecosystem component 101 of the agent 411 then validates the assertion by matching the application identifier in the assertion (e.g., the bundle-id) with the application identifier of the app 303 attempting to join as indicated by the operating system, and verifying the legitimacy of the signature. In other embodiments, the app validating module 423 validates the trust status of an app 303 seeking to join the ecosystem 301 in other ways. For example, signed assertions can be provided by sources other than apps 303, such as the backend enterprise server 309. In another embodiment, the app validating module 423 on the agent 411 supplements the validation process by referring to a whitelist of trusted apps 303 and/or a blacklist of apps 303 that are not trusted, provided by, for example, the backend enterprise server 309 or another trusted source. The whitelist and/or blacklist are used as an in-line filter to identify specific apps 303 known to be trusted or not-trusted. In yet another embodiment, apps 303 that are distributed by a trusted source such as the backend enterprise server 309 are trusted without a signed assertion. In addition to the verification of the app 303, in some embodiments the agent 411 (or joining app 303) prompts or otherwise interacts with the user, and the app 303 is only added to the ecosystem 301 in response to a confirming directive from the user. In other embodiments, this step is absent. In some but not all embodiments, the agent 411 also authenticates the user (e.g., via the backend enterprise server and/or through the inputting of a password or the like) before proceeding with the join operation.

Upon successful completion of the verification steps utilized in the given embodiment, the app adding module 419 on the agent 411 adds the joining app 303 to the ecosystem 301. This includes the directory writing module 405 on the agent 411 updating the directory 413 to add a new record 415 for the newly joined app 303. A communicating module 424 of the secure ecosystem component 101 of the agent 411 can then respond to the join request by sending the agent's public key $409_{public}$ and the ecosystem-wide symmetric encryption key $409_{ecosystem}$ to the joining app 303. The communicating module 424 can also provide the agent's signed assertion to the app 303 (recall that the agent 411 is itself an ecosystem app 303, and thus can be verified as trusted in the same ways as other ecosystem ready apps 303). The app validating module 423 of the secure ecosystem component 101 of the joining app 303 can then validate the agent's signed assertion, or validate that the agent 411 is trusted in another way, such as those discussed above in the context of the agent 411 validating apps 303. An encrypting module 425 of the secure ecosystem component 101 of the agent 411 can encrypt the data sent from the agent 411 to the app 303 with the app's public key $409_{public}$. This way, a decrypting module 427 of the secure ecosystem component 101 of the app 303 can decrypt it using the app's own private key $409_{private}$, but no other component can read it.

A directory reading module 429 of the secure ecosystem component 101 of the app 303 that has been added to the ecosystem 301 uses the ecosystem name to locate the directory 413. The app's decrypting module 427 uses the supplied ecosystem-wide symmetric encryption key 409 ecosystem to decrypt the agent's public key $409_{public}$, and uses the agent's public key $409_{public}$ to decrypt the directory 413. The app's directory reading module 429 proceeds to read the policy block from the app's directory record 415, which was added to directory 413 by the agent 411. A policy complying module 431 of the secure ecosystem component 101 of the app 303 adopts and complies with the policy specified in the app's policy block, which as explained above is the default policy for the app 303 as directed by the enterprise 300. The communicating module 424 of the app 303 then uses the address of the backend enterprise server 309 from the policy block to contact the backend enterprise server 309. The app 303 informs the backend enterprise server 309 that the app 303 has joined the specific ecosystem 301 on the specific computing device 210. The backend enterprise server 309 can provide the app 303 with any policy updates or specific policy directives, both at the time the backend enterprise server 309 learns the app 303 has joined the ecosystem 301, and on an ongoing basis during the entire time the app 303 is a member of the ecosystem 301 as desired. In response to receiving any policy directives/updates from the backend enterprise server 309, the app's policy complying module 431 adopts and complies with the updated policy accordingly.

Apps 303 within an ecosystem 301 can securely share data between them according to enterprise policy, both in the form of encrypted messages 305 and in the form of shared encrypted objects 307. For the communicating module 424 of a given app 303 to send a secure message 305 to a specific one of the other apps 303 in the ecosystem 301, the encrypting module 425 of the sending app 303 can first use the public key $409_{public}$ of the receiving app 303 (as gleaned from the directory 413) to encrypt the message 305. The decrypting module 427 of the receiving app 303 can then use its own private key $409_{private}$, which only it has, to decrypt the received message 305. To send a message 305 to more than one other app 303 (or to all of the apps 303 in the ecosystem 301), the sending app 303 can encrypt the message 305 using its own private key $409_{private}$. That way, any app 303 in the ecosystem 301, but no component outside of the ecosystem 301, can read the sending app's public key $409_{public}$ from the directory 413 and decrypt the message 305. The communicating module 424 of an app 303 can share data objects 307 (e.g., a file stored on, e.g., an SD card) with one or more other ecosystem apps 303 on a read-only basis, in which case the sharing app's encrypting module 425 can encrypt the object 307 as described above in the discussion of encrypting messages 305, depending upon whether a specific one or multiple ones of the other ecosystem apps 303 are intended to be able to access the object 307. For a shared object 307 which is to be writable by apps 303 other than the sender, the ecosystem-wide symmetric encryption key $409_{ecosystem}$ can be used to encrypt the object 307. Messages 305 and/or objects 307 can indicate the class of communication, method of encryption, and key 409 used to encrypt, for example in the clear in a header. Receiving apps 303 can then use this information to decrypt and access the encrypted content in the payload. In one embodiment, ecosystem apps 303 can share data by storing it in the directory 413.

It is to be understood that secure intra-ecosystem objects 307 and messages 305 can be based on conventional media types, but encrypted using ecosystem specific keys 409 as described above. Thus, if ecosystem apps 303 attempt to process the ecosystem specific-encrypted content as if it were in the underlying, conventional media type, the attempt would fail. This is so because operating systems automatically attempt to open content in given formats using specific, associated applications. These applications are not configured to process the encrypted data, but instead the underlying conventional media types. Therefore, a "space" of media types is managed, so as to provide support for the processing of the encrypted versions thereof by apps 303 within the ecosystem 301. A listing 417 of supported media types is maintained, along with mappings to MIME types, UTIs (in the case of iOS) and filename extensions for encrypted versions of those media types. The listing 417 is used by the secure ecosystem component 101 to properly process the ecosystem specific encrypted messages 305 and objects 307 when opening encrypted intra-ecosystem content.

It is desirable for common conventional media types to work across apps 303 written by different vendors, as well as within ecosystems 301 operating under different enterprises 300 or deployments. Therefore, in one embodiment, the publisher of the secure ecosystem component 101 publishes this listing 417, for example as a web service to which authorized third-party vendors and backend enterprise servers 309 can subscribe. Software vendors and enterprise customers can request additions to the listing 417, which can be accommodated by the publisher of the secure ecosystem component 101. This enables the same media type listing 417 to used consistently across enterprises 300 and ecosystem 301 deployments.

The user of a computing device 210 on which an ecosystem 301 is resident can choose to remove an app 303 from the existing ecosystem 301. To do so, in one embodiment the user invokes the agent 411, which removes the record 415 for the app 303 from the directory 413. In one embodiment, such a directive can also or instead come from the enterprise 300, for example from the backend enterprise server 309. In one embodiment, after removing an app 303 from the ecosystem, the agent 411 updates the ecosystem-wide symmetric encryption key $409_{ecosystem}$ as well its own keys 409, and in some cases directs the other ecosystem apps 303 to update their key pairs 409. Where app level keys 303 are updated, the apps 303 provide their new public keys $409_{public}$ to the agent 411, and the agent 411 updates the directory 413 to contain the new app level public keys $409_{public}$. In some cases, a user might simply delete an app 303 from the computing device 210 without specifically removing it from the ecosystem 301. In one embodiment, ecosystem ready apps 303 are configured to direct the agent 411 to perform the above-described removal functionality as part of their deletion processing. In some embodiments, the agent 411 periodically searches for ecosystem apps 303 that are listed in the directory 413 but have been deleted from the computing device 210. The implementation mechanics of scanning the computing device 210 for apps 303 is platform-specific. For example, under iOS the agent 411 can check for the presence of given apps 303 by using UIApplication's canOpenURL: method. Under Android, the agent 411 can locate the APK of the app 303 and validate the signature. In response to determining that an app 303 has been deleted, the agent 411 removes its directory record 415 (and in some embodiments performs the above-described key 409 processing).

Figure 6:
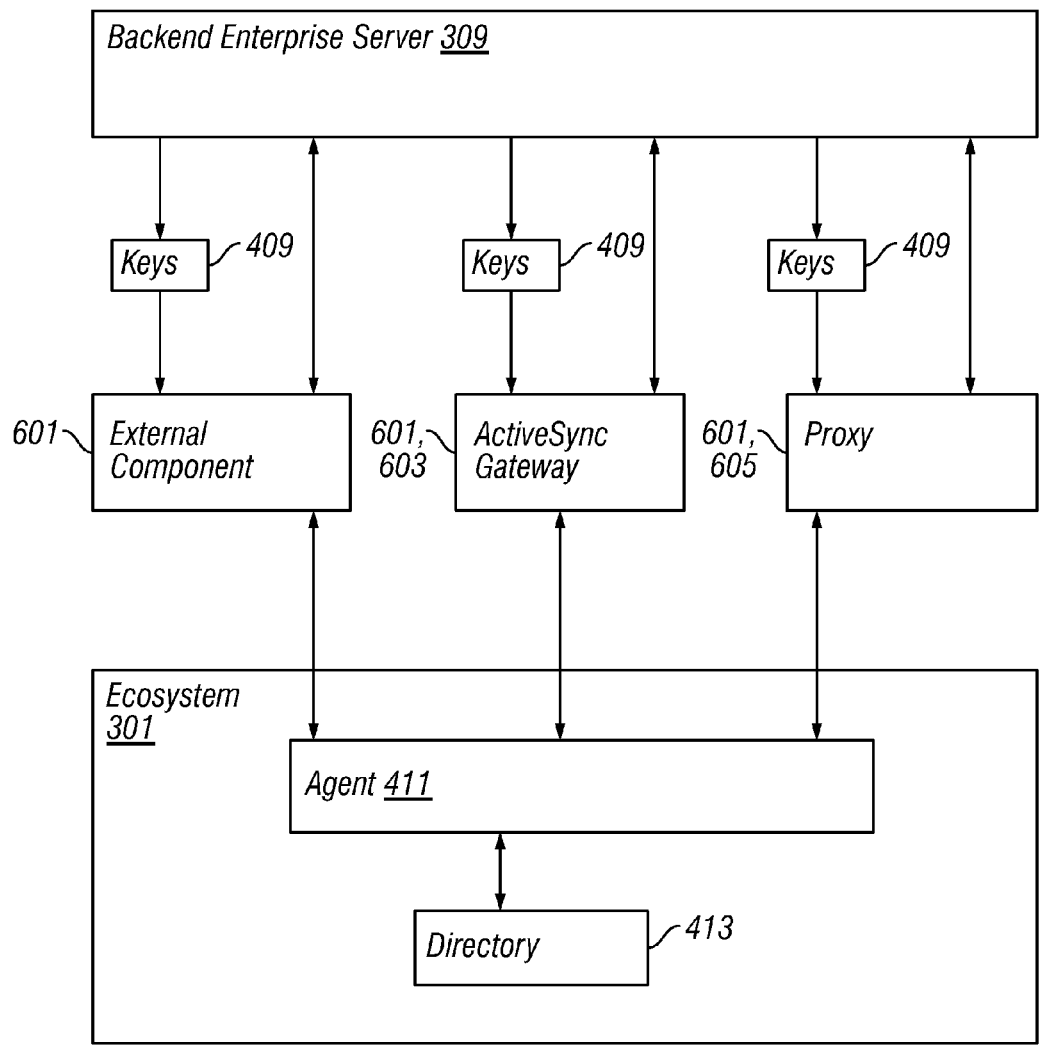
FIG. 6 is a block diagram of the operation of a secure ecosystem interfacing with external components, according to some embodiments.

Turning to FIG. 6, in some embodiments components 601 external to the computing device 210 can be members of an ecosystem 301, in order to provide services to ecosystem apps 303. An example of such an external component 601 is an ActiveSync gateway 603 that encrypts and decrypts email attachments on the fly. Another example of an external component 601 is a proxy 605 that provides encryption/decryption services for content objects 307 being sent to or received from a cloud based file hosting service. Such an external component 601 can receive an asymmetric key pair 409 from the backend enterprise server 309, which only provides keys 409 to components 601 with which it has a trust relationship and are thus eligible for ecosystem 301 admission. In one embodiment, an external component 601 is provided with a single key pair 409, whereas in another embodiment external components 601 are provided with one key pair 409 per service to be performed. When an external component 601 is brought online, it is granted access to its key pair(s) 409. In one embodiment, an external component 601 is responsible for polling the backend enterprise server 309 for its policy configuration, and periodically checking in with the backend enterprise server 309 for policy updates. In other embodiments, this information can be proactively provided to external components 601, for example by the backend enterprise server 309 or the agent 411 on the computing device 210. The backend enterprise server 309 can interact directly with the agent 411 on the computing device 210 to add a record 415 to the directory 413 for each external component 601 (or for every service provided thereby). Thus, in such embodiments the above-described protocol for an app 303 to join the ecosystem 301 is not utilized for external components 601.

Figure 7:
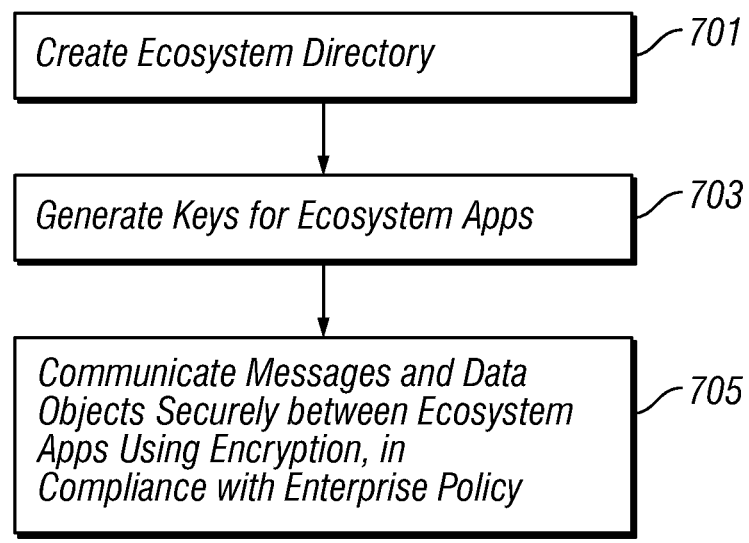
FIG. 7 is a flowchart of the operation of a secure ecosystem, according to some embodiments.

FIG. 7 is a flowchart showing steps of the operation of a secure ecosystem 301 of apps 303 on a computer 210, according to some embodiments. The directory creating module 403 creates 701 an ecosystem directory 413 on the computing device 210, wherein the ecosystem directory 413 contains an entry for each specific app 303 in the ecosystem 301 comprising policy information and identification information concerning the specific app 303. The key generating module 401 generates 703, for each specific ecosystem-ready app 303 on the computer 210, an asymmetric key pair 309, the public key $409_{public}$ of which the specific app 303 shares only with apps 303 in the ecosystem 301, and the private key $409_{private}$ of which the specific app 303 does not share at all. The communicating module communicates 705 messages 305 and data objects 307 securely between apps 303 in the ecosystem 301 in compliance with enterprise information control policy, by encrypting and decrypting the messages 305 and data objects 307 with the appropriate ecosystem app keys 409, such that the messages 305 and data objects 307 cannot be accessed from outside of the ecosystem 301 without authorization from within the ecosystem 301.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for providing a secure ecosystem comprising at least a plurality of apps on a computing device, wherein the apps in the ecosystem securely exchange encrypted data according to an information control policy of an enterprise, without allowing unauthorized access from outside of the ecosystem, the method comprising:

creating, by an ecosystem agent on the computing device, an ecosystem directory, the ecosystem directory containing an entry for each specific app in the ecosystem, each entry comprising policy information concerning the specific app and identification information concerning the specific app, wherein the ecosystem agent is an app in the ecosystem;

generating, by each specific ecosystem-ready app on the computing device, an asymmetric key pair, a public key of which the specific app shares only with apps in the ecosystem, and a private key of which the specific app does not share at all;

securely communicating data between apps in the ecosystem, such that the communicated data cannot be accessed from outside of the ecosystem without authorization from within the ecosystem;

wherein securely communicating data between apps in the ecosystem further comprises encrypting data with a first key by a providing app in the ecosystem, such that at least one receiving app in the ecosystem can decrypt the data with a second key; reading, by a first ecosystem app, a public key of a second ecosystem app, from the ecosystem directory; encrypting, by the first ecosystem app using the public key of the second ecosystem app, at least one from a group consisting of: a message to securely communicate to the second ecosystem app and a data object to securely share with the second ecosystem app; performing at least one from a group of steps consisting of: communicating the encrypted message from the first ecosystem app to the second ecosystem app and sharing the encrypted data object with the second ecosystem app by the first ecosystem; and decrypting, by the second ecosystem app, using a private key of the second ecosystem app, at least one from a group consisting of: the communicated message and the data object; and complying, by each specific app in the ecosystem, with enterprise information control policy.

2. The method of claim 1 wherein creating an ecosystem directory further comprises:

creating the ecosystem directory by the ecosystem agent at a location on the computing device, wherein the location of the ecosystem directory is based on a name of the ecosystem.

3. The method of claim 1 wherein creating an ecosystem directory further comprises:

encrypting the ecosystem directory with the ecosystem agent's private key, by the ecosystem agent, such that the ecosystem agent's public key is needed to decrypt the ecosystem directory.

4. The method of claim 1 wherein creating an ecosystem directory further comprises:

creating the ecosystem directory by the ecosystem agent such that the contained entry for each specific app in the ecosystem comprises at least 1) a policy for the specific app, 2) information enabling the specific app to obtain policy updates, and 3) information concerning the specific app enabling other apps in the ecosystem to securely communicate encrypted data to the specific app.

5. The method of claim 4 wherein the information concerning the specific app enabling other apps in the ecosystem to securely communicate encrypted data to the specific app further comprises:

a bundle identifier or package name of the specific app, an address of the specific app, a public key of the specific app, media types supported by the specific app, and a localized title of the specific app.

6. The method of claim 1 wherein creating an ecosystem directory further comprises:

writing an entry to the ecosystem directory, by the ecosystem agent, the written entry comprising at least a policy for the ecosystem agent, information enabling the ecosystem agent to obtain policy updates, and information concerning the ecosystem agent enabling other apps in the ecosystem to securely communicate encrypted data to the ecosystem agent.

7. The method of claim 1 further comprising:

generating at least one ecosystem-wide key, by the ecosystem agent; and using the at least one ecosystem-wide key to encrypt and decrypt public keys of the apps of the ecosystem, thereby preventing access of the public keys of the apps of the ecosystem from outside of the ecosystem.

8. The method of claim 1 wherein securely communicating data between apps in the ecosystem further comprises:

encrypting, by the first ecosystem app, a message to securely communicate to a plurality of other ecosystem apps, using a private key of the first ecosystem app;

communicating the encrypted message from the first ecosystem app to the plurality of other ecosystem apps;

reading, by the plurality of other ecosystem apps, a public key of the first ecosystem app, from the ecosystem directory; and decrypting the message by the plurality of other ecosystem apps, using the public key of the first ecosystem app.

9. The method of claim 1 wherein securely communicating data between apps in the ecosystem further comprises:

encrypting, by the first ecosystem app, a data object to securely share with a plurality of other ecosystem apps, using a private key of the first ecosystem app;

sharing the encrypted data object with the plurality of other ecosystem apps, by the first ecosystem app;

reading, by the plurality of other ecosystem apps, a public key of the first ecosystem app, from the ecosystem directory; and decrypting the data object by the plurality of other ecosystem apps, using the public key of the first ecosystem app.

10. The method of claim 1 wherein complying, by each specific app in the ecosystem, with enterprise information control policy further comprises:

reading, by each specific app in the ecosystem, a policy for the specific app from the ecosystem directory; and complying, by each specific app in the ecosystem, with its policy.

11. The method of claim 1 wherein complying, by each specific app in the ecosystem, with enterprise information control policy further comprises:

receiving at least one policy update from the enterprise, by at least one ecosystem app; and complying with the at least one policy update received from the enterprise, by the at least one ecosystem app.

12. The method of claim 1 further comprising:

invoking the ecosystem agent with a request to join the ecosystem, by an app;

validating a trust status of the invoking app, by the ecosystem agent; and responsive to successfully validating the invoking app as being trusted to join the ecosystem, adding the invoking app to the ecosystem, by the ecosystem agent.

13. The method of claim 12 wherein adding the invoking app to the ecosystem further comprises:

writing, by the ecosystem agent, an entry to the ecosystem directory, the written entry comprising at least a policy for the invoking app, information enabling the invoking app to obtain policy updates, and information concerning the invoking app enabling other apps in the ecosystem to securely communicate encrypted data to the invoking app; and providing the ecosystem agent's public key and the ecosystem-wide key to the invoking app, thereby enabling the invoking app to decrypt the ecosystem agent's public key with the ecosystem-wide key, and to decrypt the directory with the ecosystem agent's public key.

14. The method of claim 13 further comprising:

validating a trust status of the ecosystem agent, by the invoking app;

responsive to successfully validating the ecosystem agent as being trustworthy, decrypting the ecosystem agent's public key with the ecosystem-wide key, and decrypting the directory with the ecosystem agent's public key, by the invoking app;

reading the directory by the invoking app;

obtaining, by the invoking app, at least the invoking app's policy from the directory; and complying, by the invoking app, with its policy.

15. The method of claim 1 further comprising:

maintaining a listing of mappings between underlying media types and functionality for processing content in ecosystem specific encrypted formats based on the underlying media types; and using the listing to properly process the ecosystem specific encrypted messages and objects in the ecosystem specific encrypted formats based on the underlying media types.

16. The method of claim 1 further comprising:

providing at least one component as a member of the ecosystem, wherein the at least one component is external to the computing device and provides at least one service to ecosystem apps;

receiving at least a key pair and a policy from the enterprise, by each specific external component that is a member of the ecosystem; and complying, by each specific external component that is a member of the ecosystem, with its policy.

17. At least one non-transitory computer readable medium for providing a secure ecosystem comprising at least a plurality of apps on a computing device, wherein the apps in the ecosystem securely exchange encrypted data according to an information control policy of an enterprise, without allowing unauthorized access from outside of the ecosystem, the at least one non-transitory computer readable medium storing program code that, when loaded into computer memory and executed by a processor performs the following steps:

creating, by an ecosystem agent on the computing device, an ecosystem directory, the ecosystem directory containing an entry for each specific app in the ecosystem, each entry comprising policy information concerning the specific app and identification information concerning the specific app, wherein the ecosystem agent is an app in the ecosystem;

generating, by each specific ecosystem-ready app on the computing device, an asymmetric key pair, a public key of which the specific app shares only with apps in the ecosystem, and a private key of which the specific app does not share at all;

securely communicating data between apps in the ecosystem, such that the communicated data cannot be accessed from outside of the ecosystem without authorization from within the ecosystem;

wherein securely communicating data between apps in the ecosystem further comprises encrypting data with a first key by a providing app in the ecosystem, such that at least one receiving app in the ecosystem can decrypt the data with a second key; reading, by a first ecosystem app, a public key of a second ecosystem app, from the ecosystem directory; encrypting, by the first ecosystem app using the public key of the second ecosystem app, at least one from a group consisting of: a message to securely communicate to the second ecosystem app and a data object to securely share with the second ecosystem app; performing at least one from a group of steps consisting of: communicating the encrypted message from the first ecosystem app to the second ecosystem app and sharing the encrypted data object with the second ecosystem app by the first ecosystem; and decrypting, by the second ecosystem app, using a private key of the second ecosystem app, at least one from a group consisting of: the communicated message and the data object; and complying, by each specific app in the ecosystem, with enterprise information control policy.

18. A mobile computing device for providing a secure ecosystem comprising at least a plurality of mobile apps, wherein the mobile apps in the ecosystem securely exchange encrypted data according to an information control policy of an enterprise, without allowing unauthorized access from outside of the ecosystem, the mobile computing device comprising:

computer memory;

at least one processor;

a directory creating module residing in the computer memory, configured to create an ecosystem directory, the ecosystem directory containing an entry for each specific mobile app in the ecosystem, each entry comprising policy information concerning the specific mobile app and identification information concerning the specific mobile app;

a key generating module residing in the computer memory, configured to generate, by each specific ecosystem-ready mobile app on the mobile computing device, an asymmetric key pair, a public key of which the specific mobile app shares only with mobile apps in the ecosystem, and a private key of which the specific mobile app does not share at all;

a communicating module residing in the computer memory, configured to communicate data securely between mobile apps in the ecosystem, such that the communicated data cannot be accessed from outside of the ecosystem without authorization from within the ecosystem;

wherein securely communicating data between mobile apps in the ecosystem further comprises encrypting data with a first key by a providing mobile app in the ecosystem, such that at least one receiving mobile app in the ecosystem can decrypt the data with a second key; reading, by a first ecosystem app, a public key of a second ecosystem app, from the ecosystem directory; encrypting, by the first ecosystem app using the public key of the second ecosystem app, at least one from a group consisting of: a message to securely communicate to the second ecosystem app and a data object to securely share with the second ecosystem app; performing at least one from a group of steps consisting of: communicating the encrypted message from the first ecosystem app to the second ecosystem app and sharing the encrypted data object with the second ecosystem app by the first ecosystem; and decrypting, by the second ecosystem app, using a private key of the second ecosystem app, at least one from a group consisting of: the communicated message and the data object; and a policy complying module residing in the computer memory, configured to comply, by each specific mobile app in the ecosystem, with enterprise information control policy.

19. The method of claim 1 further comprising:

downloading at least one of the plurality of apps in the ecosystem to the computing device from a remote source;

wherein code to securely exchange encrypted data according to the information control policy of the enterprise without allowing unauthorized access from outside of the ecosystem is added to the at least one app prior to download, such that the added code changes default behaviors of the app and provides the steps of securely communicating data between apps in the ecosystem, and complying with enterprise information control policy.

\* \* \* \* \*